United States Patent
Jia et al.

(10) Patent No.: US 12,327,206 B2
(45) Date of Patent: Jun. 10, 2025

(54) CONTENT ANALYSIS AND RETRIEVAL USING MACHINE LEARNING

(71) Applicant: Dell Products L.P., Round Rock, TX (US)

(72) Inventors: Zhen Jia, Shanghai (CN); Zijia Wang, WeiFang (CN); Kenneth Durazzo, Morgan Hill, CA (US)

(73) Assignee: Dell Products L.P., Round Rock, TX (US)

( * ) Notice: Subject to any disclaimer, the term of this patent is extended or adjusted under 35 U.S.C. 154(b) by 286 days.

(21) Appl. No.: 17/829,508

(22) Filed: Jun. 1, 2022

(65) Prior Publication Data

US 2023/0394387 A1    Dec. 7, 2023

(51) Int. Cl.
| | |
|---|---|
| *G06Q 10/0631* | (2023.01) |
| *G06F 16/28* | (2019.01) |
| *G06N 20/20* | (2019.01) |

(52) U.S. Cl.
CPC ..... *G06Q 10/06311* (2013.01); *G06F 16/285* (2019.01); *G06N 20/20* (2019.01); *G05B 2219/25255* (2013.01)

(58) Field of Classification Search
CPC .. G06Q 10/06311; G06N 20/20; G06F 16/00; G06F 16/285; G06V 30/00
See application file for complete search history.

(56) References Cited

U.S. PATENT DOCUMENTS

| | | | |
|---|---|---|---|
| 2020/0302292 A1* | 9/2020 | Tseng | G06N 3/10 |
| 2022/0180206 A1* | 6/2022 | Fukuda | G06N 3/088 |

(Continued)

FOREIGN PATENT DOCUMENTS

| | | | | |
|---|---|---|---|---|
| CN | 113537492 B | * | 4/2024 | G06F 18/214 |
| WO | WO-2023192702 A1 | * | 10/2023 | |
| WO | WO-2023217525 A1 | * | 11/2023 | G05B 23/024 |

OTHER PUBLICATIONS

J. Wang, Y. Chen, R. Chakraborty and S. X. Yu, "Orthogonal Convolutional Neural Networks," 2020 IEEE/CVF Conference on Computer Vision and Pattern Recognition (CVPR), Seattle, WA, USA, 2020, pp. 11502-11512, doi: 10.1109/CVPR42600.2020.01152. (Year: 2020).*

(Continued)

*Primary Examiner* — Mehmet Yesildag
*Assistant Examiner* — Ayanna Minor
(74) *Attorney, Agent, or Firm* — Ryan, Mason & Lewis, LLP

(57) ABSTRACT

A method comprises generating a distilled dataset from an input dataset, wherein the input dataset comprises a plurality of first data samples, and the distilled dataset comprises a plurality of second data samples. In the method, an input data sample is received, and similarities are computed between the input data sample and respective ones of the plurality of second data samples. The method further comprises selecting one or more second data samples of the plurality of second data samples based, at least in part, on the computed similarities, and retrieving one or more first data samples of the plurality of first data samples from the input dataset based, at least in part, on the selected one or more second data samples. The generating is performed, at least in part, using one or more machine learning models.

20 Claims, 9 Drawing Sheets

(56) References Cited

U.S. PATENT DOCUMENTS

| | | | |
|---|---|---|---|
| 2022/0343217 A1* | 10/2022 | Mohandoss | G06F 40/40 |
| 2023/0169331 A1* | 6/2023 | Vasilev | G06V 10/764 |
| | | | 382/155 |

OTHER PUBLICATIONS

J. Wang, Y. Chen, R. Chakraborty and S. X. Yu, "Orthogonal Convolutional Neural Networks" 2020 IEEE/CVF Conference on Computer Vision and Pattern Recognition (CVPR) (Year: 2020).*

M. Aumueller et al., "ANN-Benchmarks," http://github.com/erikbern/ann-benchmarks/, Accessed Apr. 22, 2022, 27 pages.

Github, "jsubercaze/simhashdb," https://github.com/jsubercaze/simhashdb, Accessed Apr. 22, 2022, 3 pages.

Wikipedia, "Capsule Neural Network," https://en.wikipedia.org/wiki/Capsule_neural_network, Feb. 28, 2022, 8 pages.

V. Kurama, "Capsule Networks: A Quick Primer," https://blog.paperspace.com/capsule-networks/, Jul. 17, 2020, 13 pages.

Geeks for Geeks, "Residual Networks (ResNet)—Deep Learning," https://www.geeksforgeeks.org/residual-networks-resnet-deep-learning/, Jan. 27, 2022, 16 pages.

T. Wang et al., "Dataset Distillation," arXiv:1811.10959v3, Feb. 24, 2020, 14 pages.

G. Hinton et al., "Distilling the Knowledge in a Neural Network," arXiv: 1503.02531v1, Mar. 9, 2015, 9 pages.

S. Sabour et al., "Dynamic Routing Between Capsules," arXiv:1710.09829v2, Nov. 7, 2017, 11 pages.

Y. Lecun et al., "Gradient-Based Learning Applied to Document Recognition," Proceedings of the IEEE, Nov. 1998, 46 pages.

E. Strubell et al., "Energy and Policy Considerations for Deep Learning in NLP," Proceedings of the 57th Annual Meeting of the Association for Computational Linguistics, Jul. 28-Aug. 2, 2019, pp. 3645-3650.

U.S. Appl. No. 17/569,030 filed in the name of Zijia Wang et al. on Jan. 5, 2022, and entitled "Label Inheritance for Soft Label Generation in Information Processing System.".

* cited by examiner

211 — [0, 0.82, 0, 0, 0, 0.03, 0.11, 0, 0.04]

212 — [0, 0, 0, 0.07, 0, 0, 0, 0, 0.93]

213 — [0, 0, 0, 0.07, 0, 0, 0, 0.91, 0.02]

214 — [0, 0, 0.97, 0, 0, 0, 0, 0.03, 0]

| Result | SR1 | SR2 | DISTANCE USING OTHER METRIC |
|---|---|---|---|
| 0 | power lcdidi01 23 process isi_ipmi_d of service isi_ipmi_d has failed to restart after multiple attempts | abcsupply dal-Isilon 6 process isi_ipmi_d of service isi_ipmi_d has failed to restart after multiple attempts | 10 |
| ... | ... | ... | ... |
| 1 | ifscluster4 there is at least one smartpool at or over capacity | ifscluster2 how to disable dial-homes for there is at least one smartpool at or over capacity | 7 |
| 1 | pwisieh01 cluster is inaccessible due to ad time being out of sync by 18 minutes emc new service . . . . | active directory integration permission errors emc new service request text 2/9/2016 2:57 pm preferred | 10 |

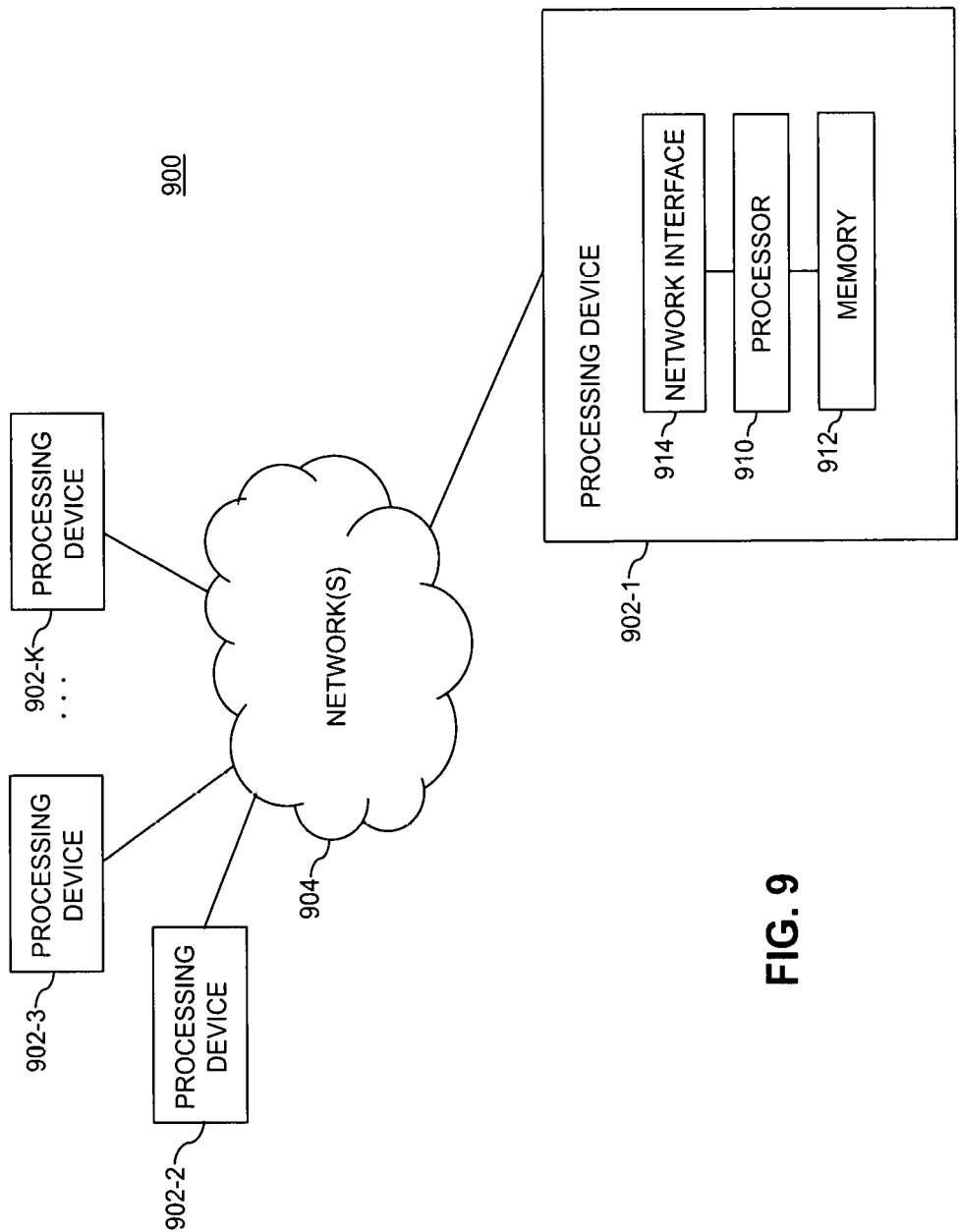

CONTENT ANALYSIS AND RETRIEVAL USING MACHINE LEARNING

FIELD

The field relates generally to information processing systems, and more particularly to providing techniques for content analysis and retrieval in such information processing systems.

BACKGROUND

It is generally realized that knowledge of past content can be helpful in understanding present content. By way of example only, in enterprise customer service systems, customers may have the capability to submit technical support service requests for issues they encounter when using enterprise devices and/or systems. Some enterprises include systems to manage customer service requests and technical support agents to respond to and resolve the service requests. The technical support agents may have different levels of proficiency in connection with how to resolve device and/or system issues. Techniques to inform technical support agents about previous resolution procedures can improve resolution efficiency, especially when the technical support agents are relatively inexperienced and need guidance on how to solve a particular issue.

SUMMARY

Illustrative embodiments provide techniques that utilize machine learning to find existing content that is similar to incoming content. For example, illustrative embodiments utilize machine learning techniques to find previously solved technical support requests which are similar to incoming technical support requests.

In one embodiment, a method comprises generating a distilled dataset from an input dataset, wherein the input dataset comprises a plurality of first data samples, and the distilled dataset comprises a plurality of second data samples. In the method, an input data sample is received, and similarities are computed between the input data sample and respective ones of the plurality of second data samples. The method further comprises selecting one or more second data samples of the plurality of second data samples based, at least in part, on the computed similarities, and retrieving one or more first data samples of the plurality of first data samples from the input dataset based, at least in part, on the selected one or more second data samples. The generating is performed, at least in part, using one or more machine learning models.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 5 depicts a table of service request pairs according to an illustrative embodiment.

FIGS. 8 and 9 show examples of processing platforms that may be utilized to implement at least a portion of an information processing system according to illustrative embodiments.

DETAILED DESCRIPTION

Figure 1:
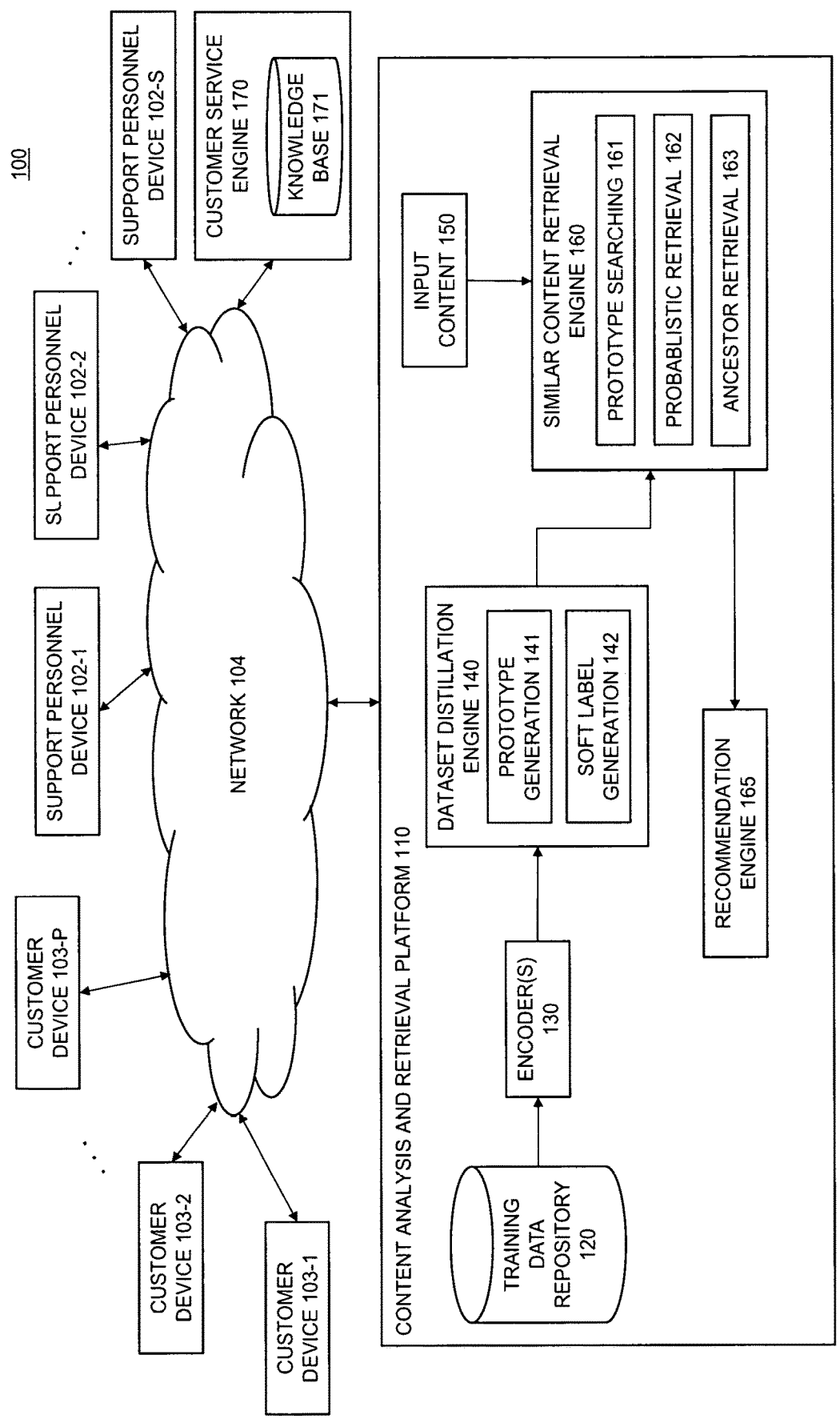
FIG. 1 depicts details of an information processing system with a content analysis and retrieval platform for analyzing input content and recommending similar content according to an illustrative embodiment.
Figure 2A:
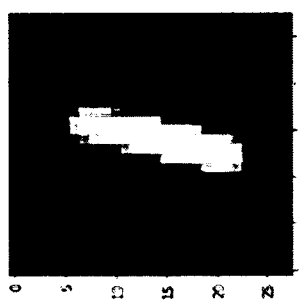
FIGS. 2A, 2B, 2C and 2D depict extracted capsules from a classification task and their corresponding soft labels according to an illustrative embodiment.
Figure 2B:
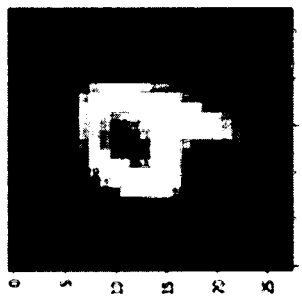
Figure 2C:
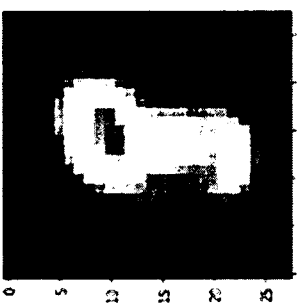
Figure 2D:
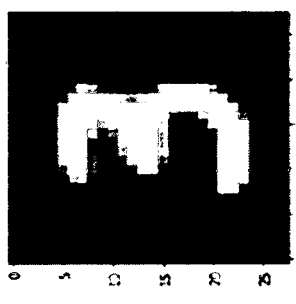

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

As used herein, "natural language understanding (NLU)" is to be broadly construed to refer to a sub-category of natural language processing in artificial intelligence (AI) where natural language input is disassembled and parsed to determine appropriate syntactic and semantic schemes in order to comprehend and use languages. NLU may rely on computational models that draw from linguistics to understand how language works, and comprehend what is being said by a user.

As used herein, "image" is to be broadly construed to refer to a visual representation which is, for example, produced on an electronic display such as a computer screen or other screen of a device. An image as used herein may include, but is not limited to, a screen shot, window, message box, error message or other visual representation that may be produced on a device. Images can be in the form of one or more files in formats including, but not necessarily limited to, Joint Photographic Experts Group (JPEG), Portable Network Graphics (PNG), Graphics Interchange Format (GIF), and Tagged Image File (TIFF).

In illustrative embodiments, machine learning (ML) techniques are used to retrieve content which is similar to incoming requests so that the similar content can be used address and/or respond to the incoming requests. For example, an enterprise delivering large scale and complex information services may have a team of technical support agents processing a large volume of customer service requests. The customer service requests may correspond to, for example, software issues, hardware issues, network issues, operational issues and/or other problems that may be associated with systems or devices. The technical support agents and/or a customer relationship management (CRM) system may issue reports about what caused the issues and how the issues may have been resolved. Such reports may be stored in, for example, a knowledge base. The embodiments advantageously improve the efficiency of the resolution process by using machine learning techniques to analyze incoming support cases and identify previously addressed and resolved cases from the knowledge base which are similar to the incoming support cases. According to the illustrative embodiments, data from the identified similar cases is provided to the technical support agents for use in resolving current issues.

In illustrative embodiments, machine learning techniques are used to facilitate the process of customer service request triage by implementing a retrieval strategy which computes similarities of resolved service requests to a submitted service request. Resolved service requests with high similarity scores are recommended to a technical support agent handling the submitted service request so that the technical support agent can rely on past approaches which have been successful in resolving problems to solve a current issue. In addition, technical support agents may increase their technical expertise by referring to detailed resolution records of similar resolved service requests.

Advantageously, the embodiments implement a content analysis and retrieval framework which computes similarities between incoming requests and prototypes generated using dataset distillation techniques. The embodiments use encoders to extract features from an input dataset of resolved service requests. The incoming requests and resolved service requests can be in the form of text, speech and/or images, with different encoders corresponding to the request form being implemented to generate the features. Trained machine learning models analyze content corresponding to a problem received from a user and determine matching content and corresponding support cases that can be used to generate resolutions which are specific to the problem.

FIG. 1 shows an information processing system 100 configured in accordance with an illustrative embodiment. The information processing system 100 comprises support personnel devices 102-1, 102-2, . . . 102-S (collectively "support personnel devices 102") and customer devices 103-1, 103-2, . . . 103-P (collectively "customer devices 103"). The support personnel devices 102 and customer devices 103 communicate over a network 104 with a content analysis and retrieval platform 110. The information processing system further comprises a customer service engine 170, which may communicate over the network 104 with the support personnel devices 102, customer devices 103 and the content analysis and retrieval platform 110.

The support personnel devices 102 and customer devices 103 can comprise, for example, Internet of Things (IoT) devices, desktop, laptop or tablet computers, mobile telephones, or other types of processing devices capable of communicating with the content analysis and retrieval platform 110 and/or the customer service engine 170 over the network 104. Such devices are examples of what are more generally referred to herein as "processing devices." Some of these processing devices are also generally referred to herein as "computers." The support personnel devices 102 and customer devices 103 may also or alternately comprise virtualized computing resources, such as virtual machines (VMs), containers, etc. The support personnel devices 102 and customer devices 103 in some embodiments comprise respective computers associated with a particular company, organization or other enterprise. The variables P and S, and other similar index variables herein such as K and L are assumed to be arbitrary positive integers greater than or equal to 1.

The customer service engine 170 comprises a knowledge base 171. According to one or more embodiments, a CRM system includes technical support personnel (e.g., agents) tasked with assisting users that experience issues with their devices, systems, software, firmware, etc. Users such as, for example, customers or clients, may contact the technical support personnel (which may also be referred to as "users" herein) when they have device and/or system problems and require technical assistance to solve the problems. Customers or clients may communicate with the technical support personnel via the support personnel devices 102 and customer devices 103 and/or access the customer service engine 170 through one or more interfaces. The interfaces include multiple communication channels, for example, websites, email, live chat, social media, mobile application and telephone sources. Customers or clients can access the customer service engine 170 through their customer devices 103. In response to customers, client or other user inquiries and/or requests for assistance, technical support personnel may create support tickets and/or cases summarizing the issues and the steps taken to resolve the issues.

As part of agent assisted support tickets and/or cases, screen shots and images related to the issues are collected along with any textual and/or speech log files from the customer, client or other user, and stored in the knowledge base 171. These images, as well as any textual and/or speech log files, can be used as reference data for technical support personnel to help diagnose and fix that specific case. After the case is complete, this data and images remain in the knowledge base 171 as historical records.

The terms "client," "customer," "personnel" or "user" herein are intended to be broadly construed so as to encompass numerous arrangements of human, hardware, software or firmware entities, as well as combinations of such entities. Content analysis and retrieval services may be provided for users utilizing one or more machine learning models, although it is to be appreciated that other types of infrastructure arrangements could be used. At least a portion of the available services and functionalities provided by the content analysis and retrieval platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the content analysis and retrieval platform 110, as well as to support communication between the content analysis and retrieval platform 110 and connected devices (e.g., support personnel devices 102 and customer devices 103), between the customer service engine 170 and connected devices and/or between other related systems and devices not explicitly shown.

In some embodiments, the support personnel devices 102 are assumed to be associated with repair technicians, system administrators, information technology (IT) managers, software developers release management personnel or other authorized personnel configured to access and utilize the content analysis and retrieval platform 110.

The content analysis and retrieval platform 110 and the customer service engine 170 in the present embodiment are assumed to be accessible to the support personnel devices 102 and customer devices 103, and vice-versa, over the network 104. In addition, the content analysis and retrieval platform 110 is accessible to the customer service engine 170, and vice-versa, over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content analysis and retrieval platform 110, on behalf of respective infrastructure tenants each corresponding to one or more users associated with respective ones of the support personnel devices 102, provides a platform for analyzing input content and recommending similar content.

Referring to FIG. 1, the content analysis and retrieval platform 110 comprises a training data repository 120, one or more encoders 130, a dataset distillation engine 140, a similar content retrieval engine 160, which receives input content 150, and a recommendation engine 165. The dataset distillation engine 140 includes a prototype generation component 141 and a soft label generation component 142. The similar content retrieval engine 160 includes a prototype searching component 161, a probabilistic retrieval component 162 and an ancestor retrieval component 163.

When there are system issues and/or outages, customers, clients or other users may communicate with technical support personnel via, for example, the customer devices 103 and the support personnel devices 102, and/or the customer service engine 170. Such communications may include, for example, textual and/or verbal descriptions of the problem provided to the technical support personnel via the interfaces noted herein above (e.g., websites, email, live chat, social media, mobile application and telephone sources). Such textual and/or verbal inputs can include, but are not necessarily limited to, service request titles, summaries and detailed descriptions. In addition, customers, clients or other users may be presented with certain images on their devices (e.g., customer devices 103) with messages indicating operating system or component failures. For example, devices may fail to function due to missing or outdated components, and the user may encounter an image including one or more textual phrases about missing, outdated and/or uninstalled components. Such images may also be provided to the technical support personnel via the interfaces noted herein above. The input content 150 noted herein may comprise at least portions of the textual descriptions, verbal descriptions and/or images provided to technical support personnel following a system or device problem or failure.

Referring to the system 100 in FIG. 1, the dataset distillation engine 140 generates a distilled dataset from an input dataset comprising training data from the training data repository 120. Similar to the input content 150, the training data may comprise textual descriptions, verbal descriptions and/or images associated with previous technical support issues that were addressed and resolved. The training data may be retrieved from, for example, the knowledge base 171, by the content analysis and retrieval platform 110. As noted herein above, the embodiments use encoders 130 to extract features from an input dataset of resolved service requests.

Different encoders 130 corresponding to the request form (e.g., text, speech, images) are implemented to generate the features. For example, in the case of textual and/or verbal inputs, service request triaging can be formulated as a text classification problem, with, for example, the service request titles, summaries and detailed descriptions being input features than can be mapped to available solutions (e.g., classes). Such classes may comprise, for example, the intent and/or sentiment of a textual or verbal (e.g., speech) input. In this case, the embodiments base a textual or verbal message, where the words come one after another over a period of time, on a time series model. The encoder 130 may comprise, but is not necessarily limited to, a Recurrent Neural Network (RNN). In order to efficiently analyze a message, illustrative embodiments use a bi-directional RNN, which uses two separate processing sequences, one from left to right and another from right to left. In order to address RNNs having exploding or vanishing gradient issues for longer and complex dialogs or messages, the embodiments utilize a bi-directional RNN with long short-term memory (LSTM) for NLP and NLU. Unlike a traditional neural network, where input and output are independent, in an RNN the output from a previous step feeds into the input of a current step. As a result, when performing language processing, previous words are taken into account when predicting subsequent words of a sentence. An RNN includes a hidden state which remembers one or more words in the sentence. The bi-directional RNN of the embodiments performs bi-directional processing of a sentence (from past and from future in two directions in parallel). A bi-directional RNN addresses problems where sentences are too long, and some previous words in the sentence are not available due to limited hidden states.

For text or speech input, the encoder 130 may also comprise, but is not necessarily limited to, a transformer-based neural network machine learning model. As used herein, a "transformer" is to be broadly construed to refer to a deep learning model that differentially weighs the significance of portions of input data. Similar to RNNs, transformers manage sequential input data. However, transformers do not necessarily process the data in order, and utilize mechanisms which provide context for any position in an input sequence. By identifying context, a transformer does not need to process the beginning of a data sequence before the end of the data sequence, which allows for more parallelization than RNNs to reduce training time. A non-limiting example of a transformer-based neural network machine learning model that may be used by the embodiments is a Bidirectional Encoder Representations from Transformers (BERT) model, which uses context from both directions, and uses encoder parts of transformers to learn a representation for each token.

In the case of image inputs, an encoder 130 may comprise a deep neural network (DNN), such as, for example, a residual neural network (ResNet). A ResNet utilizes a skip connection technique to skip training from one or more layers and connect directly to an output. As a result, instead of layers learning an underlying mapping, the network fits itself to the residual mapping. Since the illustrative embodiments utilize extracted features from input datasets, the embodiments are advantageously applicable to multiple input forms (e.g., text, verbal and image inputs) by varying the encoder 130 for generating these features.

In generating the distilled dataset, based on the output from the encoder(s) 130, the dataset distillation engine 140 synthesizes a smaller dataset than the input dataset (e.g., with a smaller number of data samples than the input dataset) such that a machine learning model trained on the synthetic dataset will match or approach the test accuracy of the machine learning model trained on the input dataset (e.g., training dataset). According to illustrative embodiments, the dataset distillation engine 140, and more particularly the prototype generation component 141, generates a distilled dataset Z from an input dataset X, where the mutual information between X and Z is maximized. The mutual information can be represented in equation (1) as follows:

$$I(X, Z) = \int\int p(z|x)\hat{p}(x) \log \frac{p(z|x)}{p(z)} dx dz \quad (1)$$

where $\hat{p}(x)$ is the distribution of original dataset X and $p(z)=\int p(z|x)\hat{p}(x)dx$. A distilled image $z \in Z$ follows $p(z|x) = \max_{p(Z|x)} I(X, Z)$. The dataset distillation engine 140 uses one or more machine learning models to generate the distilled dataset. In illustrative embodiments, the dataset distillation engine 140 uses a capsule neural network (Caps-Net) to generate the distilled dataset. The CapsNet uses structures called "capsules" to model hierarchical relationships. The capsules (also referred to herein as "prototypes") are added to a convolutional neural network (CNN). As explained in more detail in FIGS. 2A-2D, the capsules correspond to respective vectors (referred to herein as "labels" or "soft labels") identifying a plurality of probabilities corresponding to which of a plurality of classes respective ones of the plurality of capsules belong. The vectors provide a similar result to classification with localization in CNNs. The soft labels are generated by the soft label generation component 142.

In connection with embodiments where the datasets comprise images, a CapsNet advantageously accounts for images with different spatial relationships. For example, an image may have the correct parts when compared with another image, but the parts may not be in the same spatial relationship as the other image (e.g., the positions of different body parts may be different between images). For image recognition, a CapsNet accounts for the scenario where viewpoint changes may have nonlinear effects at the pixel level, and linear effects at the part or object level. In other words, a CapsNet can learn what images look like in different orientations.

According to one or more embodiments, in generating the distilled dataset, the dataset distillation engine 140, and more particularly, the prototype generation component 141, computes a loss to reduce similarities between the capsules and make the capsules orthogonal to each other. Loss is computed according to the following equation (2).

$$L_{or} = \Sigma_{i,j \in Z} \langle i,j \rangle \quad (2)$$

Here $\langle i, j \rangle$ refers to the cosine similarity between two prototypes. The overall loss to be minimized is represented as follows in equation (3).

$$\mathbb{L} = L_{or}(Z) - I(X,Z) \quad (3)$$

According to illustrative embodiments, a CapsNet is trained using classification tasks on the training dataset. Then, capsules, such as those shown in FIGS. 2A-2D (e.g., capsules 201, 202, 203 and 204) are extracted in the trained network. Due, at least in part, to the orthogonality of the capsules, the capsules include all or almost all of the information in the original dataset. As a result, the capsules represent the distilled data. The capsules combined with the soft labels comprise the distilled dataset. For example, the capsules 201, 202, 203 and 204 and their respective labels 211, 212, 213 and 214 illustrate at least a portion of an example distilled dataset. As explained in more detail herein, the labels and the information provided therein are used for downstream tasks. The capsules 201, 202, 203 and 204 in FIGS. 2A-2D are being used as examples to explain a classification task and soft label generation, and the embodiments are not necessarily limited to the depicted images. For example, the content analysis and retrieval platform 110 is configured to classify various types of images such as, but not necessarily limited to, on-screen images that may be encountered by users in technical support or other IT scenarios.

The capsules (prototypes) are patterns of the original dataset. For example, the capsules 201-204 are derived from the trained CapsNet. For example, the capsules correspond to topics in a topic model, and the soft label generation component 142 determines the topic distribution for each image, which is used to generate a probabilistic bag of images (PBoI) for each prototype from which the soft labels (e.g., labels 211-214) are generated.

For a training dataset comprising, for example, a plurality of images (e.g., training data from the training data repository 120), a CapsNet derives capsules (e.g., capsules 201, 202, 203 and 204) representing topics (e.g., distilled images) from images in the training dataset. More particularly, for each topic, a PBoI representation is obtained from the CapsNet. These topics are considered to be the distilled data while the PBoI representation provides an indication to identify the ancestors of capsules (distilled data). Then, through an inheritance relation extraction step, the labels of these ancestors can be used to generate soft labels of capsules (distilled data) (e.g., labels 211-214).

By way of further detail, a CapsNet is first trained based on training images from a training dataset to obtain capsules. Capsules can be used as distilled data in downstream tasks. Then, an inheritance relation extraction step calculates the relation between capsules and the training dataset to obtain a PBoI representation for each capsule from which soft labels for capsules are generated.

It is to be appreciated that, in a self-training application, distilled data can be used to obtain smooth pseudo-labels for unseen data, then these pseudo-labels can be used to complete the self-training process. In dataset distillation (also known as proxy data generation), because the topic generation process used in illustrative embodiments is explainable and explicit, either the topics or the top images in each topic can be used as the distilled data. Then, the distilled data can be used for effective performance in tasks such as data fusion and few-shot learning compared with conventional dataset distillation algorithms.

It is to be understood that a CapsNet mimics neuron-based brain functioning by incorporating dynamic routing algorithms to estimate features of objects such as pose, e.g., position, size, orientation, deformation, velocity, albedo, hue, texture, and so on. The dynamic routing algorithms perform their computations on their inputs and then encapsulate the results into a small vector of highly informative outputs, i.e., a capsule. A capsule can be considered a replacement or substitute for an average artificial neuron of an artificial neural network (ANN). However, while an artificial neuron deals with scalars, a capsule deals with vectors.

To be a distilled data set, labels are needed for downstream tasks. Accordingly, illustrative embodiments provide a PBoI approach for soft label generation. As mentioned above, topics can be derived from the trained CapsNet as illustrated in FIGS. 2A-2D. The capsules are patterns of the original data set similar to topics in a topic model. Thus, the topic distribution can be identified for each image which can be used to generate a PBoI representation for each topic (capsule).

Figure 3:
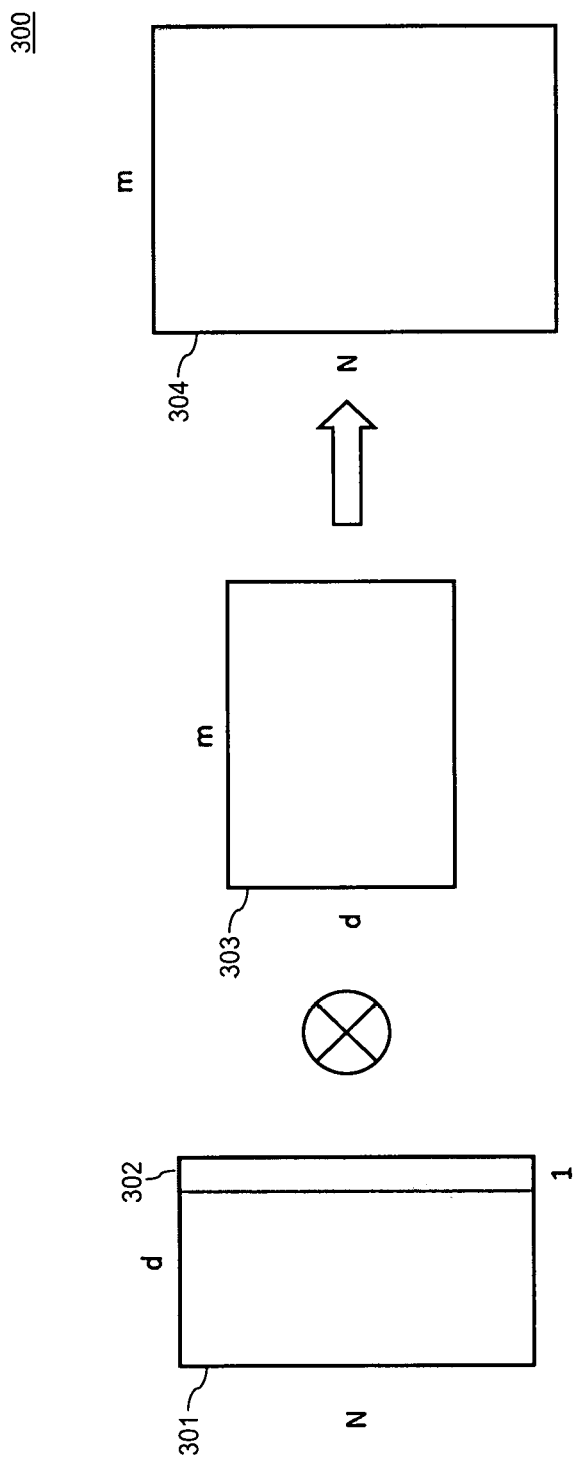
FIG. 3 depicts a visualization of a probabilistic bag of images (PBoI) generation process according to an illustrative embodiment.

For example, referring to the visualization 300 of a PBoI generation process in FIG. 3, given N samples from the input dataset and d capsules (where N and d are integers), after training of the CapsNet, the soft label generation component 142 generates a d*m matrix 303, where m represents the dimensions of each capsule, and an N*m matrix 304. The number of capsules (d) and the dimensions of each capsule (m) are designated hyper parameters, and can vary based on the design of the machine learning model. In illustrative embodiments, the number of samples (N) corresponds to the number of samples in the input (e.g., training) dataset. The N*d matrix 301 represents the relation between images and capsules, like topic distribution in topic models. Each column 302 in the N*d matrix 301 becomes the PBoI of each capsule, where the values in the PBoI represent the similarity between an image and a given capsule. For example, N samples with d capsules could generate an N*1 PBoI representation for one prototype, while each capsule has m dimensions. After multiplication of matrix 301 with matrix 303, the resulting N*m matrix 304 comprises the feature representation of an original image.

Based on the N samples having their own labels, the soft label generation component 142 generates soft labels for each capsule by weighted summation in the PBoI. For example, referring to FIGS. 2A-2D, the labels 211-214 represent a plurality of probabilities corresponding to which of a plurality of classes respective ones of the plurality of capsules 201, 202, 203 and 204 belong. Specifically, for capsules 201, 202, 203 and 204, each label 211-214 identifies a plurality of probabilities corresponding to which of numbers 0-9 respective ones of the plurality of capsules 201, 202, 203 and 204 represent, i.e., [probability that image is number 0, probability that image is number 1, probability that image is number 2, probability that image is number 3, probability that image is number 4, probability that image is number 5, probability that image is number 6, probability that image is number 7, probability that image is number 8, probability that image is number 9]. For example, for capsule 201, the label 211 "[0, 0.82, 0, 0, 0, 0, 0.03, 0.11, 0, 0.04]" indicates that most of samples inside its PBoI correspond to the number 1 (0.82 or 82%). In addition, since the pixel grouping comprising the "1" image may also be components of images of the numbers 6, 7 and 9, some probabilities (e.g., 0.03 (3%), 0.11 (11%) and 0.04 (4%)) are also assigned to the numbers 6, 7 and 9. For capsule 202, the label 212 "[0, 0, 0, 0, 0.07, 0, 0, 0, 0, 0.93]" indicates that most of samples inside its PBoI correspond to the number 9 (0.93 or 93%). In addition, since the pixel grouping comprising the "9" image may also be components of an image of the number 4, some probability (e.g., 0.07 (7%)) is also assigned to the number 4. For capsule 203, the label 213 "[0, 0, 0, 0.07, 0, 0, 0, 0, 0.91, 0.02]" indicates that most of samples inside its PBoI correspond to the number 8 (0.91 or 91%). In addition, since the pixel grouping comprising the "8" image may also be components of the images of the numbers 3 and 9, some probabilities (e.g., 0.07 (7%) and 0.02 (2%)) are also assigned to the numbers 3 and 9. For capsule 204, the label 214 "[0, 0, 0.97, 0, 0, 0, 0, 0, 0.03, 0]" indicates that most of samples inside its PBoI correspond to the number 3 (0.97 or 97%). In addition, since the pixel grouping comprising the "3" image may also be components of an images of the number 8, some probability (e.g., 0.03 (3%)) is also assigned to the number 8. The probabilities in each soft label (e.g., labels 211-214) add up to 1, and when multiplied by 100 represent percentages. While FIGS. 2A-2D show numbers, the embodiments are not limited thereto. For example, the embodiments may correspond to different types of images depicting different objects (e.g., letters, animals, people, symbols, icons, etc.). Depending on the types of images involved, the number of entries (e.g., probabilities) in corresponding soft labels may vary, and are not limited to ten entries shown in the labels 211-214. For example, there may more or less than ten probability entries depending on the number of classes for a given image type.

Advantageously, illustrative embodiments consider the capsules as topics in topic models, which can also be viewed as distilled data, which captures pattern information. However, it is further realized that the increase in computational requirements for modern deep learning (i.e., a form of machine learning that is based on an artificial neural network) presents a range of technical problems. It has been found that the training of deep learning models has an extremely high energy consumption, on top of already problematic financial and computational cost and time requirements. One path for mitigating these technical problems is by reducing network sizes. Knowledge distillation has been proposed as a method for imbuing smaller, more efficient networks with all the knowledge of their larger counterparts. Instead of decreasing network size, a second path to efficiency may instead be to decrease dataset size. Illustrative embodiments utilize dataset distillation to realize this second path.

More particularly, dataset distillation is the process of creating a small number of synthetic samples that can quickly train a network to the same, or substantially the same, accuracy it would achieve if trained on the original (complete) dataset. It may seem counter-intuitive that training a model on a small number of synthetic images coming from a completely different distribution than the training data can achieve the original accuracy, but for models with known initializations, this is indeed feasible. For example, dataset distillation has been shown to achieve 94% accuracy on MNIST, for a hand-written digit recognition task, after training LeNet on just ten synthetic images. The MNIST database (Modified National Institute of Standards and Technology database) is a large database of handwritten digits that is commonly used for training various image-based information processing systems.

Self-training is a form of a semi-supervised learning method, which iteratively generates task-specific pseudo-labels using a model trained on some labelled data and then retrains the model using the labelled data. However, there are some technical issues in this bootstrap process, one of them being noise in the pseudo-labelled data. Some conventional approaches treat this issue as learning from noisy labels, while others realize that the pseudo-labels can be optimized by sample selection or label smoothing. However, none of the conventional approaches focus on data properties. As mentioned, a modified knowledge distillation approach is to distill the large dataset into a smaller one to find the meaningful samples such as means in the feature spaces to capture the data properties. Means can also be called bases of the data. These bases can be used to formulate the latent representations of the data in a probabilistic way using an expectation maximization approach.

As noted herein above, a CapsN et is trained to obtain capsules, and the training dataset and capsules are used in an inheritance relation extraction step to generate soft labels for each capsule. The capsules (e.g., capsules 201-204) are meaningful and contain almost all information in the input dataset because of the orthogonality of the capsules. Therefore, capsules can also be viewed as distilled data.

Referring back to FIG. 1, for particular input content 150 (e.g., at least portions of the textual descriptions, verbal descriptions and/or images provided to technical support personnel following a system or device problem or failure) the similar content retrieval engine 160 identifies and retrieves content which is similar to the input content 150. In more detail, based on the prototypes (e.g., capsules) and corresponding soft labels generated by the dataset distillation engine 140, the prototype searching component 161 identifies prototypes that are similar to the input content 150. For example, when input content 150 is received, the prototype searching component 161 computes the similarity between the input content 150 and the generated prototypes (e.g., capsules) and normalizes the similarities as soft label generation weights. For a new sample i (e.g., input content 150), the weight of prototype j $\omega_{i,j}$ can be calculated using following equation (4):

$$\omega_{i,j} = \frac{sim\langle i, j\rangle}{\sum_{p \in P} sim\langle i, p\rangle} \quad (4)$$

where P is the set of prototypes, and sim < . . . , . . . > means the similarity between a prototype and input sample. According to illustrative embodiments, the prototype searching component 161 uses cosine similarity to compute the similarities.

In an illustrative embodiment, after getting the weights from equation (4), the probabilistic retrieval component 162 assigns a soft label to the new sample i using the following equation (5):

$$L_{soft,i} = \Sigma_{p \in P} \omega_{i,p} \times L_{soft,p} \quad (5)$$

where $L_{soft,i}$ means the soft label of sample i (e.g., input content 150). For example, in illustrative embodiments, referring back to FIGS. 2A and 2B, assuming the weight of capsule 201 is 0.9 and the weight of capsule 202 is 0.1, the probabilistic retrieval component 162 multiplies the label 211 by 0.9 and the label 212 by 0.1 and combines the result to generate the new soft label for the sample i.

The probabilistic retrieval component 162 samples the instances from the input dataset based on the assigned soft label. For example, if the value of a first element of the soft label is 0.5, and the search is for 10 instances of similar content, the probabilistic retrieval component 162 will sample 5 instances (0.5×10) from the input dataset from a first class corresponding to the first element, and so on depending on the values of the remaining elements in the soft label.

Alternatively, the ancestor retrieval component 163 retrieves from the input dataset the ancestor data samples of the prototype mostly related to the input content 150 (e.g., the prototype with the largest weight from equation (4)). Each prototype is related to a plurality of ancestor data samples from the input dataset. The ancestor retrieval component 163 retrieves the ancestor data samples for a given prototype from the input dataset based on the soft label of the given prototype. Using the label 211 "[0, 0.82, 0, 0, 0, 0, 0.03, 0.11, 0, 0.04]" as a non-limiting illustrative example, if the capsule 201 has the highest similarity to the input content 150 (e.g., highest weight from equation (4)), then for 100 ancestor data samples, the ancestor retrieval component 163 retrieves 82 "1" image ancestor data samples, three "6" image ancestor data samples, 11 "7" image ancestor data samples and four "9" image ancestor data samples. The ancestor retrieval component 163 proportionally samples the images from each class based on the soft label of the chosen prototype.

Figure 4:
FIG. 4 depicts example original and retrieved images for a plurality of classes according to an illustrative embodiment.

FIG. 4 depicts a layout 400 of example original and retrieved images for a plurality of classes. In a non-limiting example, referring to the layout 400 in FIG. 4, each row represents one class, where the leftmost image is the original image, and the other images in the row are images that may be retrieved by the content analysis and retrieval platform 110 for the corresponding original image. As can be seen, class may be based on activity (e.g., flying, standing, swimming, etc.) and position (e.g., a particular pose or profile). The layout in FIG. 4 is being used as an example to explain how different images may be classified based on their different characteristics (e.g., orientation, position, activity, etc.), and the embodiments are not necessarily limited to the depicted images. For example, the content analysis and retrieval platform 110 is configured to classify various types of images such as, but not necessarily limited to, on-screen images that may be encountered by users in technical support or other IT scenarios.

In illustrative embodiments, the recommendation engine 165 uses the retrieved similar data samples to generate and transmit one or more messages to support device personnel via the support personnel devices 102. For example, in response to the content analysis and retrieval platform 110 receiving the input content 150 for a particular technical support issue, the recommendation engine 165 transmits the data samples retrieved by the probabilistic retrieval and/or ancestor retrieval components 162 and 163 to the support device personnel so that the support device personnel can reference the data samples when attempting to resolve the technical support issue. Alternatively, or in addition, based on the data samples retrieved by the probabilistic retrieval and/or ancestor retrieval components 162 and 163, the recommendation engine 165 automatically retrieves resolved cases from the knowledge base 171 that relate to the retrieved data samples, and transmits the retrieved resolved cases to the support device personnel so that the support device personnel can reference the resolved cases when attempting to resolve the technical support issue. In another embodiment, based on the retrieved resolved cases, the recommendation engine 165 automatically executes a resolution procedure and/or remedial operations on one or more customer devices 103 experiencing the failure or issue from which the input content 150 was derived. The resolution procedure and/or remedial operations include, but are not necessarily limited to, automatically modifying configurations of the customer devices 103, automatically switching operations from a failed component of a customer device 103 to a redundant component of the customer device 103 if such a redundant component is available, ceasing operations on a particular customer device 103 or component thereof, automatically generating and transmitting alerts and/or IT support tickets to one of the support personnel devices 102 or customer service engine 170, and/or automatically uploading remedial code, firmware, upgrades and/or other applications and software to the customer devices 103.

FIG. 5 depicts a table 500 of sample textual service request pairs SR1 and SR2, which the content analysis and retrieval platform 110 is capable of analyzing. For example, the first column ("Result") identifies whether the content analysis and retrieval platform 110 concluded that the service request pairs were similar or dissimilar, with "0" indicating dissimilar and "1" indicating similar. As can be seen in the table 500, the content analysis and retrieval platform 110 concluded that the service request pairs (SR1 and SR2) in rows 2 and 3 were similar, while the service request pairs (SR1 and SR2) in row 1 were not similar. The last column ("Distance Using Other Metric") illustrates that distance between the service requests using another metric for finding similarity may provide incorrect results when compared with the techniques of the illustrative embodiments. For example, in the third row, the content analysis and retrieval platform 110 correctly concludes that service requests SR1 and SR2 are similar in that the service requests SR1 and SR2 both relate to access issues ("inaccessible" and "permission errors"). However, as can be seen in row 3, column 3, another metric provides incorrect results (distance of 10, indicating that the service requests SR1 and SR2 are not similar).

Figure 6:
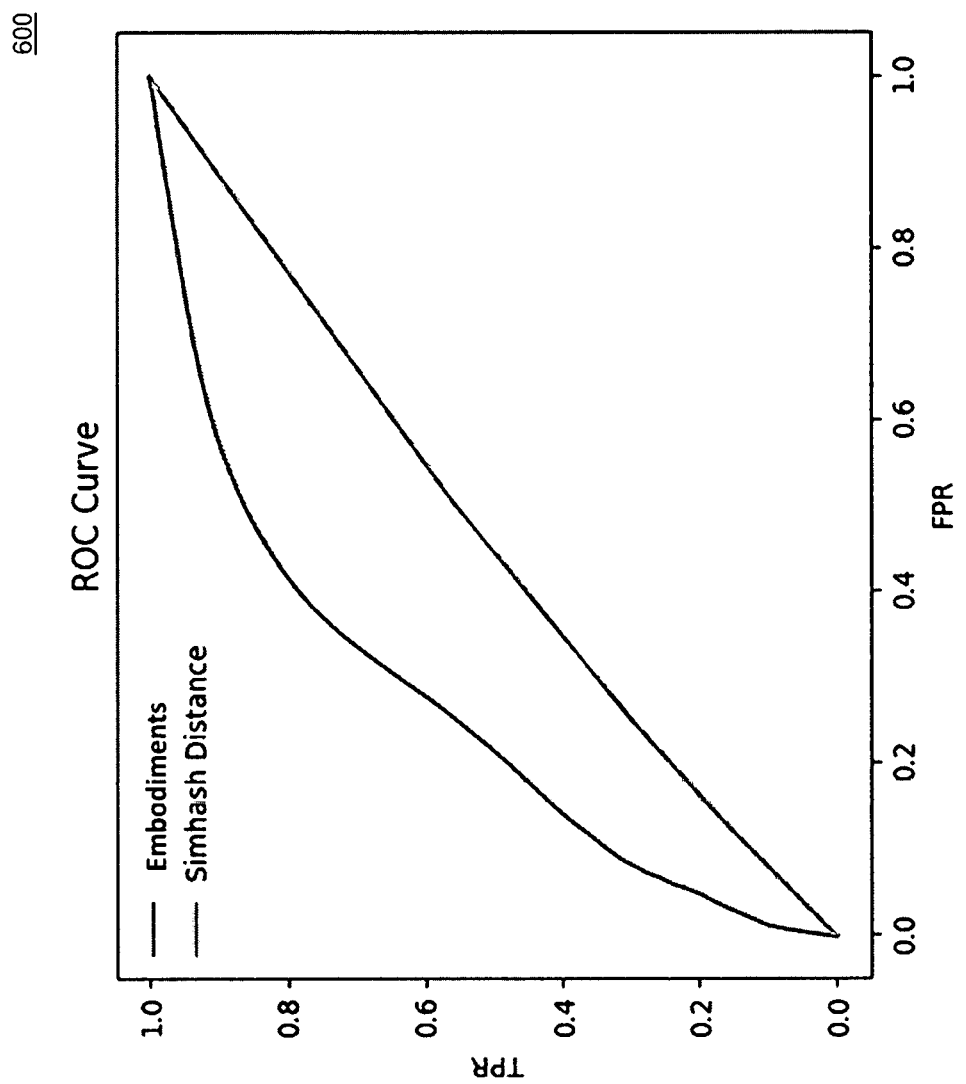
FIG. 6 depicts receiver operating characteristic (ROC) curves comparing simhash distance to techniques of illustrative embodiments.

FIG. 6 depicts a plot 600 of receiver operating characteristic (ROC) curves comparing simhash distance to the techniques of the illustrative embodiments. As can be seen in the plot 600 of true positive rate (TPR) vs. false positive rate (FPR) for distances measured using the techniques of the embodiments and simhash distance, the improvement over a simhash approach is significant. The result of a simhash signature process to find similar content is poor (AUC=0.5330), while the result of using the techniques of the illustrative embodiments to find similar content is significantly improved (AUC=0.7421).

According to one or more embodiments, databases (e.g., knowledge base 171), repositories (e.g., training data repository 120), stores and/or corpuses used by the content analysis and retrieval platform 110 and/or customer service engine 170 can be configured according to a relational database management system (RDBMS) (e.g., PostgreSQL). Databases, repositories, stores and/or corpuses in some embodiments are implemented using one or more storage systems or devices associated with the content analysis and retrieval platform 110 and/or customer service engine 170. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the content analysis and retrieval platform 110, the training data repository 120, the encoder(s) 130, the dataset distillation engine 140, the similar content retrieval engine 160 and the recommendation engine 165 in other embodiments can be implemented at least in part externally to the content analysis and retrieval platform 110, for example, as stand-alone servers, sets of servers or other types of systems coupled to the network 104. For example, the training data repository 120, the encoder(s) 130, the dataset distillation engine 140, the similar content retrieval engine 160 and the recommendation engine 165 may be provided as cloud services accessible by the content analysis and retrieval platform 110.

The training data repository 120, the encoder(s) 130, the dataset distillation engine 140, the similar content retrieval engine 160 and the recommendation engine 165 in the FIG. 1 embodiment are each assumed to be implemented using at least one processing device. Each such processing device generally comprises at least one processor and an associated memory, and implements one or more functional modules for controlling certain features of the training data repository 120, the encoder(s) 130, the dataset distillation engine 140, the similar content retrieval engine 160 and/or the recommendation engine 165.

At least portions of the content analysis and retrieval platform 110 and the components thereof may be implemented at least in part in the form of software that is stored in memory and executed by a processor. The content analysis and retrieval platform 110 and the components thereof comprise further hardware and software required for running the content analysis and retrieval platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the training data repository 120, the encoder(s) 130, the dataset distillation engine 140, the similar content retrieval engine 160, the recommendation engine 165 and other components of the content analysis and retrieval platform 110 in the present embodiment are shown as part of the content analysis and retrieval platform 110, at least a portion of the training data repository 120, the encoder(s) 130, the dataset distillation engine 140, the similar content retrieval engine 160, the recommendation engine 165 and other components of the content analysis and retrieval platform 110 in other embodiments may be implemented on one or more other processing platforms that are accessible to the content analysis and retrieval platform 110 over one or more networks. Such components can each be implemented at least in part within another system element or at least in part utilizing one or more stand-alone components coupled to the network 104.

It is assumed that the content analysis and retrieval platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the training data repository 120, the encoder(s) 130, the dataset distillation engine 140, the similar content retrieval engine 160, the recommendation engine 165 and other components of the content analysis and retrieval platform 110, and the elements thereof can each be implemented in the form of one or more LXCs running on one or more VMs. Other arrangements of one or more processing devices of a processing platform can be used to implement the training data repository 120, the encoder(s) 130, the dataset distillation engine 140, the similar content retrieval engine 160 and the recommendation engine 165, as well as other components of the content analysis and retrieval platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the content analysis and retrieval platform 110 to reside in different data centers. Numerous other distributed implementations of the content analysis and retrieval platform 110 are possible.

Accordingly, one or each of the training data repository 120, the encoder(s) 130, the dataset distillation engine 140, the similar content retrieval engine 160, the recommendation engine 165 and other components of the content analysis and retrieval platform 110 can each be implemented in a distributed manner so as to comprise a plurality of distributed components implemented on respective ones of a plurality of compute nodes of the content analysis and retrieval platform 110.

It is to be appreciated that these and other features of illustrative embodiments are presented by way of example only, and should not be construed as limiting in any way.

Accordingly, different numbers, types and arrangements of system components such as the training data repository 120, the encoder(s) 130, the dataset distillation engine 140, the similar content retrieval engine 160, the recommendation engine 165 and other components of the content analysis and retrieval platform 110, and the elements thereof can be used in other embodiments. It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the content analysis and retrieval platform can be offered to cloud infrastructure customers or other users as part of FaaS, CaaS and/or PaaS offerings.

Figure 7:
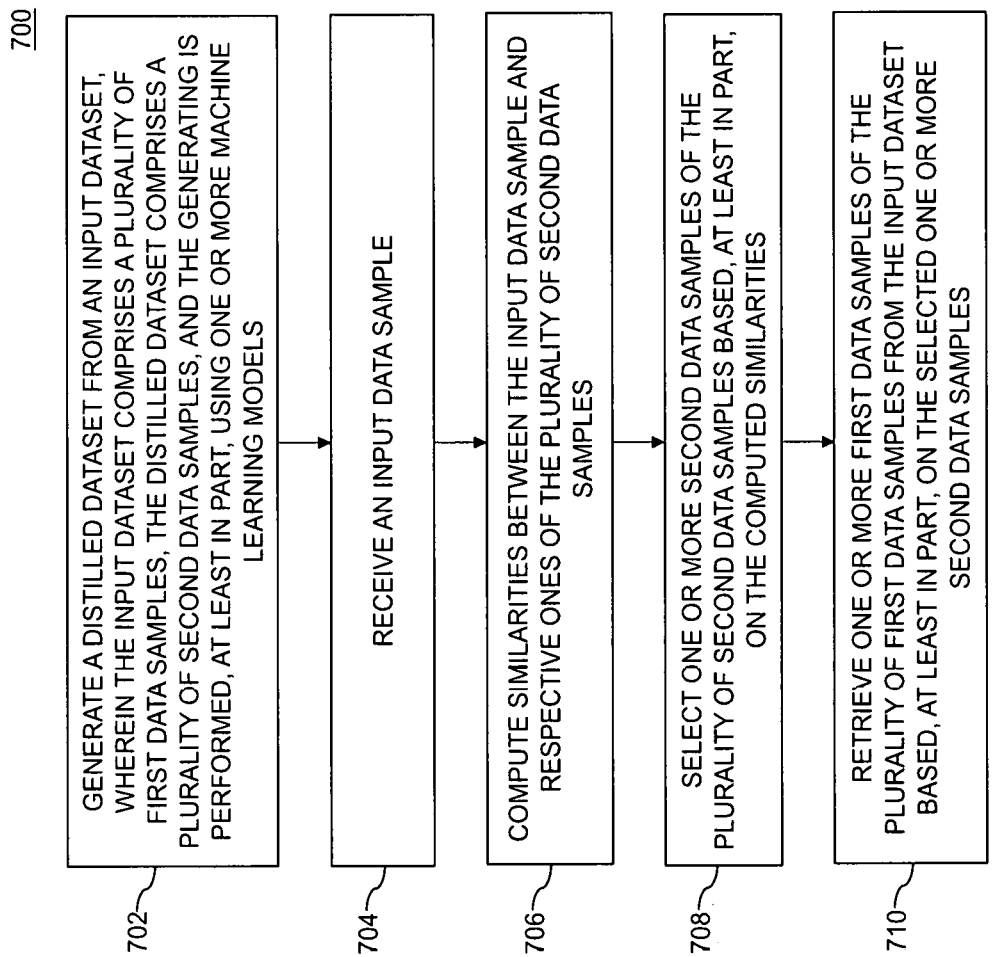
FIG. 7 depicts a process for analyzing input content and recommending similar content according to an illustrative embodiment.

The operation of the information processing system 100 will now be described in further detail with reference to the flow diagram of FIG. 7. With reference to FIG. 7, a process 700 for analyzing input content and recommending similar content as shown includes steps 702 through 710, and is suitable for use in the system 100 but is more generally applicable to other types of information processing systems comprising a content analysis and retrieval platform configured for analyzing input content and recommending similar content.

In step 702, a distilled dataset is generated from an input dataset. The input dataset comprises a plurality of first data samples, and the distilled dataset comprises a plurality of second data samples. The generating is performed, at least in part, using one or more machine learning models. The input data sample, the plurality of first data samples and the plurality of second data samples comprise images, text samples and/or speech samples.

In step 704, an input data sample is received. In step 706, similarities between the input data sample and respective ones of the plurality of second data samples are computed. In step 708, one or more second data samples of the plurality of second data samples are selected based, at least in part, on the computed similarities. The computed similarities are normalized, and weights are assigned to respective ones of the plurality of second data samples based, at least in part, on the normalized computed similarities. The selecting of the one or more second data samples is based, at least in part, on the assigned weights. In step 710, one or more first data samples of the plurality of first data samples are retrieved from the input dataset based, at least in part, on the selected one or more second data samples.

The one or more machine learning models comprises a CapsNet, and the plurality of second data samples comprise a plurality of capsules. The input dataset comprises a training dataset for the one or more machine learning models.

In illustrative embodiments, generating the distilled dataset comprises computing a loss to reduce similarities between the plurality of second data samples. Additionally, respective labels are generated for respective ones of the plurality of second data samples. The labels identify a plurality of probabilities corresponding to which of a plurality of classes respective ones of the plurality of second data samples belong. The retrieving of the one or more first data samples of the plurality of first data samples from the input dataset is based, at least in part, on one or more of the plurality of probabilities.

According to one or more embodiments, a plurality of features are extracted from the plurality of first data samples of the input dataset, wherein the extracting is performed using an encoder. The input data sample can correspond to at least one technical support issue, and at least one message is generated in response to the technical support issue based, at least in part, on the retrieved one or more first data samples. The at least one message is transmitted to at least one support personnel device.

It is to be appreciated that the FIG. 7 process and other features and functionality described above can be adapted for use with other types of information systems configured to analyze input content and recommend similar content in a content analysis and retrieval platform or other type of platform.

The particular processing operations and other system functionality described in conjunction with the flow diagram of FIG. 7 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a content analysis and retrieval platform as disclosed herein can provide a number of significant advantages relative to conventional arrangements. For example, unlike conventional techniques, the embodiments advantageously provide techniques which utilize the prototypes generated from a CapsNet dataset distillation algorithm to efficiently find similar content. Additionally, the dataset distillation and similar content retrieval utilize extracted features, so the embodiments can be applied to multiple input types (e.g., images text and speech) by substituting different feature extractors (e.g., encoders).

Unlike conventional approaches, the embodiments provide technical solutions which compare prototypes with inputted content to find similar prototypes, and retrieve ancestor data samples of the similar prototypes. In addition, the technical solutions generate soft labels for each prototype, which identify probabilities corresponding to which of a plurality of classes respective ones of the prototypes belong. The soft labels are used in connection with probabilistic retrieval methods to sample instances of similar content from an input dataset.

Advantageously, the embodiments provide an optimized machine learning framework that facilitates the process of customer service request triage by utilizing dataset distillation and prototype searching to find resolved service requests which are similar to submitted service requests. The embodiments offer technical solutions that automatically provide the similar content to support personnel and/or use the identified similar content to automatically recommend or take remedial actions to alleviate technical issues. Unlike conventional techniques, which have numerous restrictions, strict retraining processes, and are difficult to apply to different types of content, the content analysis and retrieval platform advantageously utilizes a dataset distillation algorithm based on a CapsNet to fully exploit generated prototypes to find similar content, thereby improving efficiency and utilizing less computational resources than previous approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the content analysis and retrieval platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a content analysis and retrieval platform in illustrative embodiments. These and other cloud-based systems in illustrative embodiments can include object stores.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
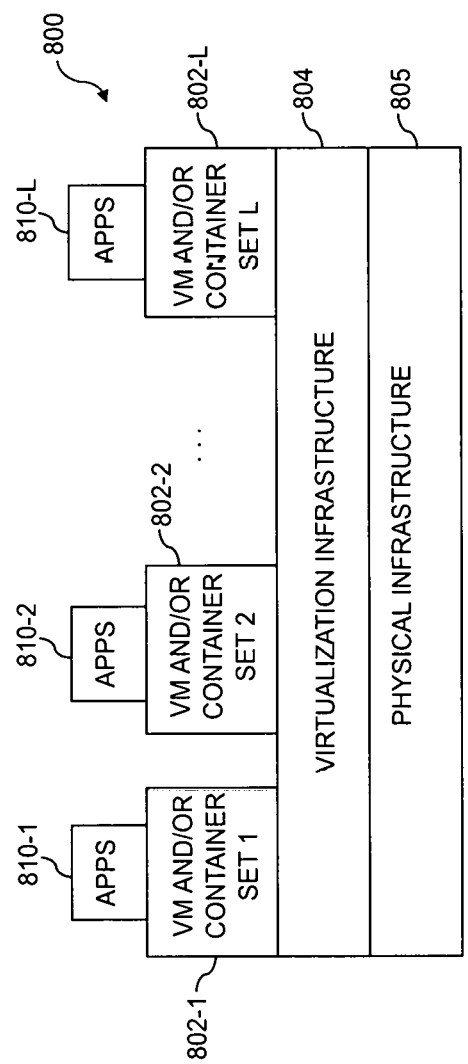

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the content analysis and retrieval platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and content analysis and retrieval platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
training a neural network, wherein the training comprises:
receiving an input dataset comprising training data;
generating a distilled dataset by inputting the input dataset into a selected encoder of a plurality of encoders, the selected encoder corresponding to a format of the input dataset, wherein the training data of the input dataset comprises a plurality of first data samples, and the distilled dataset is generated by one or more machine learning models and comprises a plurality of second data samples based on an output of the selected encoder, wherein the plurality of second data samples is smaller than the plurality of first data samples, and wherein mutual information between the plurality of first data samples and the plurality of second data samples is maximized; and
computing a loss to reduce similarities between the plurality of second data samples to make the plurality of second data samples orthogonal to each other;
calculating a relation between the plurality of second data samples and the training data to obtain a probabilistic bag of images representation for each of the plurality of second data samples; and
generating a label for each of the plurality of second data samples based on the probabilistic bag of images representation;
receiving, at the trained neural network, an input data sample;
computing, using the trained neural network, similarities between the input data sample and respective ones of the plurality of second data samples based on the labels of the plurality of second data samples;
selecting, using the trained neural network, one or more second data samples of the plurality of second data samples based, at least in part, on the computed similarities; and
retrieving, using the trained neural network, one or more first data samples of the plurality of first data samples from the input dataset based, at least in part, on the selected one or more second data samples;
wherein the steps of the method are executed by at least one processing device operatively coupled to a memory.

2. The method of claim 1, wherein the input data sample, the plurality of first data samples and the plurality of second data samples comprise images.

3. The method of claim 1, wherein the input data sample, the plurality of first data samples and the plurality of second data samples comprise at least one of text samples and speech samples.

4. The method of claim 1, wherein the one or more machine learning models comprises a capsule neural network, and the plurality of second data samples comprise a plurality of capsules.

5. The method of claim 4, wherein the input dataset comprises a training dataset for the capsule neural network.

6. The method of claim 1, wherein the labels of the plurality of second data samples identify a plurality of probabilities corresponding to which of a plurality of classes the respective ones of the plurality of second data samples belong.

7. The method of claim 6, wherein the retrieving of the one or more first data samples of the plurality of first data samples from the input dataset is further based, at least in part, on one or more of the plurality of probabilities.

8. The method of claim 1, further comprising extracting a plurality of features from the plurality of first data samples of the input dataset, wherein the extracting is performed using the selected encoder.

9. The method of claim 1, further comprising normalizing the computed similarities and assigning weights to the respective ones of the plurality of second data samples based, at least in part, on the normalized computed similarities.

10. The method of claim 9, wherein the selecting of the one or more second data samples is based, at least in part, on the assigned weights.

11. The method of claim 1, wherein the input data sample corresponds to at least one technical support issue, and the method further comprises:
generating at least one message in response to the technical support issue based, at least in part, on the retrieved one or more first data samples; and
transmitting the at least one message to at least one support personnel device.

12. An apparatus comprising:
a processing device operatively coupled to a memory and configured to:
train a neural network, wherein the training comprises:
receiving an input dataset comprising training data;
generating a distilled dataset by inputting the input dataset into a selected encoder of a plurality of encoders, the selected encoder corresponding to a format of the input dataset, wherein the training data of the input dataset comprises a plurality of first data samples, and the distilled dataset is generated by one or more machine learning models and comprises a plurality of second data samples based on an output of the selected encoder, wherein the plurality of second data samples is smaller than the plurality of first data samples, and wherein mutual information between the plurality of first data samples and the plurality of second data samples is maximized; and
computing a loss to reduce similarities between the plurality of second data samples to make the plurality of second data samples orthogonal to each other;
calculating a relation between the plurality of second data samples and the training data to obtain a probabilistic bag of images representation for each of the plurality of second data samples; and
generating a label for each of the plurality of second data samples based on the probabilistic bag of images representation;
receive, at the trained neural network, an input data sample;
compute, using the trained neural network, similarities between the input data sample and respective ones of the plurality of second data samples based on the labels of the plurality of second data samples;
select, using the trained neural network, one or more second data samples of the plurality of second data samples based, at least in part, on the computed similarities; and
retrieve, using the trained neural network, one or more first data samples of the plurality of first data samples from the input dataset based, at least in part, on the selected one or more second data samples.

13. The apparatus of claim 12, wherein the labels of the plurality of second data samples identify a plurality of probabilities corresponding to which of a plurality of classes the respective ones of the plurality of second data samples belong.

14. The apparatus of claim 13, wherein the retrieving of the one or more first data samples of the plurality of first data samples from the input dataset is further based, at least in part, on one or more of the plurality of probabilities.

15. The apparatus of claim 12, wherein the processing device is further configured to extract a plurality of features from the plurality of first data samples of the input dataset, wherein the extracting is performed using the selected encoder.

16. The apparatus of claim 12, wherein the input data sample corresponds to at least one technical support issue, and wherein the processing device is further configured to:
   generate at least one message in response to the technical support issue based, at least in part, on the retrieved one or more first data samples; and
   transmit the at least one message to at least one support personnel device.

17. An article of manufacture comprising a non-transitory processor-readable storage medium having stored therein program code of one or more software programs, wherein the program code when executed by at least one processing device causes said at least one processing device to perform the steps of:
   training a neural network, wherein the training comprises:
      receiving an input dataset comprising training data;
      generating a distilled dataset by inputting the input dataset into a selected encoder of a plurality of encoders, the selected encoder corresponding to a format of the input dataset, wherein the training data of the input dataset comprises a plurality of first data samples, and the distilled dataset is generated by one or more machine learning models and comprises a plurality of second data samples based on an output of the selected encoder, wherein the plurality of second data samples is smaller than the plurality of first data samples, and wherein mutual information between the plurality of first data samples and the plurality of second data samples is maximized; and
      computing a loss to reduce similarities between the plurality of second data samples to make the plurality of second data samples orthogonal to each other;
      calculating a relation between the plurality of second data samples and the training data to obtain a probabilistic bag of images representation for each of the plurality of second data samples; and
      generating a label for each of the plurality of second data samples based on the probabilistic bag of images representation;
   receiving, at the trained neural network, an input data sample;
   computing, using the trained neural network, similarities between the input data sample and respective ones of the plurality of second data samples based on the labels of the plurality of second data samples;
   selecting, using the trained neural network, one or more second data samples of the plurality of second data samples based, at least in part, on the computed similarities; and
   retrieving, using the trained neural network, one or more first data samples of the plurality of first data samples from the input dataset based, at least in part, on the selected one or more second data samples.

18. The article of manufacture of claim 17, wherein the labels of the plurality of second data samples identify a plurality of probabilities corresponding to which of a plurality of classes the respective ones of the plurality of second data samples belong.

19. The article of manufacture of claim 17, wherein the processing device is further configured to extract a plurality of features from the plurality of first data samples of the input dataset, wherein the extracting is performed using the selected encoder.

20. The article of manufacture of claim 17, wherein the input data sample corresponds to at least one technical support issue, and wherein the program code when executed by at least one processing device further causes said at least one processing device to:
   generate at least one message in response to the technical support issue based, at least in part, on the retrieved one or more first data samples; and
   transmit the at least one message to at least one support personnel device.

* * * * *